H. E. DECKEBACH.
PROCESS OF BREWING BEER OF LOW ALCOHOLIC CONTENTS.
APPLICATION FILED APR. 25, 1908.

977,603.

Patented Dec. 6, 1910.

Witnesses
A. McCormack.
Zelia Prather

Inventor
Henry E. Deckebach
By Walter F. Murray
Attorney

UNITED STATES PATENT OFFICE.

HENRY E. DECKEBACH, OF CINCINNATI, OHIO.

PROCESS OF BREWING BEER OF LOW ALCOHOLIC CONTENTS.

977,603.  Specification of Letters Patent.  Patented Dec. 6, 1910.

Application filed April 25, 1908. Serial No. 429,136.

*To all whom it may concern:*

Be it known that I, HENRY E. DECKEBACH, a citizen of the United States of America, and resident of Cincinnati, county of Hamilton, State of Ohio, have invented certain new and useful Improvements in Processes of Brewing Beer of Low Alcoholic Contents, of which the following is a specification.

The object of my invention is a process of removing alcohol from wort which is fermenting in a closed tub, of facilitating the growth of the yeast cells, and of purifying the wort.

Figure 1:
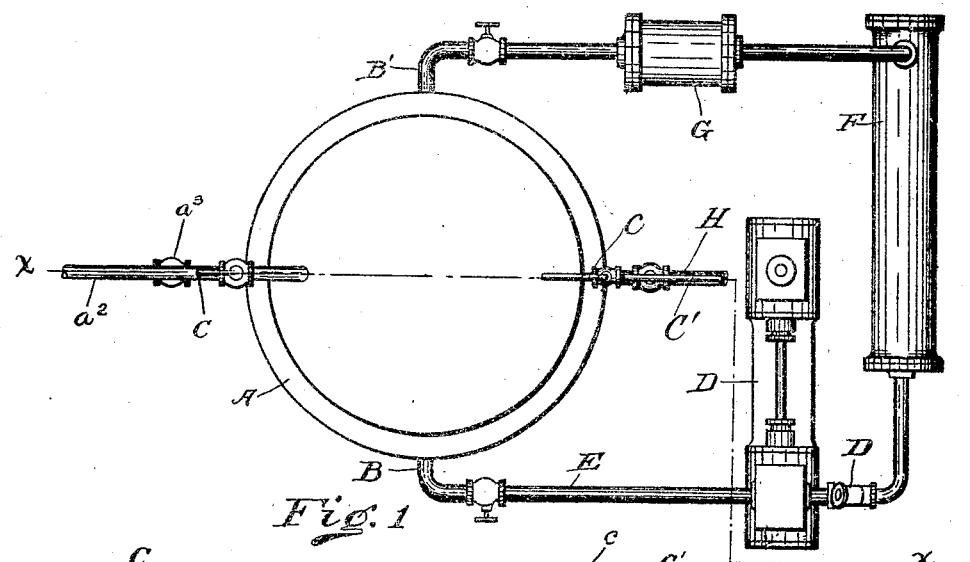
Figure 2:
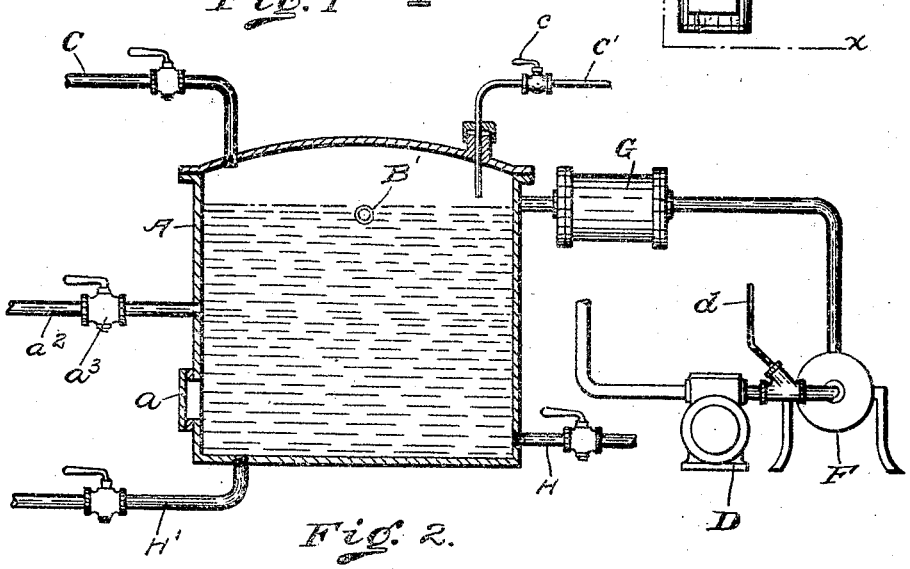

In the accompanying drawings in which I have illustrated an apparatus for carrying on my process, Figure 1 is a plan view of a fermenting tub and of a cooling apparatus for use in carrying on my process. Fig. 2 is a vertical sectional view taken upon irregular line $x$—$x$ of Fig. 1.

Before the wort is led into the closed tub, A, the desired amount of yeast may be placed therein through the man-hole, $a$, which is thereupon closed. The wort is then led from the cooler, not shown, into fermenting tub, A, through pipe, $a^2$. It contains the usual twelve per cent. extract and is at a temperature of about forty-five degrees Fahrenheit. After the wort rises above the height of the pipes, B, B', the flow is cut off by means of the cock, $a^3$. Oxygen under pressure of from five to ten pounds above that of the atmosphere and at a temperature of forty-five degrees Fahrenheit is admitted into the top of the tub through pipe, C. The exit pipe, C', should be opened to about one half the size of the inlet pipe, C, by means of the regulating cock, $c$. The inner end of the exit pipe, C', stands immediately above the level of the liquid. The fermentation is then allowed to proceed under this pressure, of five to ten pounds, and at a temperature of forty-five degrees Fahrenheit, until the amount of extract in the wort is reduced to about eight per cent. This fermentation proceeds at a moderate rate because of the lowered temperature of the wort. As the yeast cells rise to the surface laden with gases, they discharge them at the surface of the liquid. These gases, which are found to consist largely of alcoholic vapors and of carbonic acid gas, are carried out of the tub, by the pipe, C'. The yeast cells which have discharged their gases, take a fresh amount of oxygen and then sink to the bottom of the liquid. There is thus a constant discharge of the vapors through the pipe, C', and a constant supply of fresh oxygen from the pipe, C. The oxygen under pressure upon top of the wort stimulates the action of the yeast cells and I have found that under these conditions the proportion of carbonic acid gas to alcohol is increased.

After the extract in the wort has been reduced to eight per cent., the temperature of the oxygen entering through the pipe, C, is raised to eighty degrees Fahrenheit. The fermentation in the tub, A, will then proceed more rapidly than in the previous step because of the higher temperature, and the discharge of gases from the pipe, C', will be more rapid. This fermentation is allowed to proceed until the amount of extract has been reduced to about four per cent. Then the temperature of the oxygen entering through pipe, C, is reduced to thirty-eight degrees Fahrenheit, thereby checking the rate of the fermentation which is then allowed to proceed until the amount of extract has been reduced to three per cent. The amount of extract present at any time is ascertained by the use of a saccharometer, in the usual manner. After the extract has been thus reduced to three per cent., the beer is withdrawn from the surface of the fluid by means of pump, D, through the pipe, E. The pump forces the beer then through a cooler, F, thence through a strainer, G, and then through pipe, B', back to the surface of the fluid in the tub, A. Between the pump and the cooler, F, cool oxygen is forced into the wort through the pipe, $d$. The circulation of the beer through the cooler is continued until the wort contained in the fermenting tub has been reduced to thirty-two and one half degrees Fahrenheit. In the strainer, G, albuminoids and dead yeast cells will be retained. The beer is then found to contain less than three per cent. of alcohol. By raising the temperature of the oxygen to one hundred and twenty degrees Fahrenheit, instead of to eighty degrees, as above described, I have found that the alcohol is reduced to less than one-half of one per cent.

By this process I am enabled to produce a beverage which is non-intoxicating, but in which the full flavor of beer is retained.

The wort is withdrawn from the tub by means of pipe, H, and the yeast may be withdrawn by means of pipe, H'.

What I claim is:

1. The process of brewing beer of low alcoholic contents consisting in placing it in a closed tub with its yeast, admitting cooled oxygen under pressure upon its surface, permitting it to ferment, withdrawing the gases from the surface while admitting the oxygen thereto, then after a partial fermentation admitting oxygen at a higher temperature and under pressure to the surface, while carrying the vapors due to fermentation, from the surface.

2. The process of brewing beer of low alcoholic contents consisting in placing it in a closed tub with its yeast, admitting cooled oxygen under pressure upon its surface, permitting it to ferment, withdrawing the gases from the surface while admitting the oxygen thereto, then after a partial fermentation admitting oxygen at a higher temperature and under pressure to the surface, while carrying off the vapors due to fermentation from the surface, and then after another partial fermentation admitting oxygen of a degree lower than the first and permitting the fermentation to proceed to a full fermentation.

HENRY E. DECKEBACH.

Witnesses:
WALTER F. MURRAY,
AGNES McCORMACK.